(12) United States Patent
Jurjanz et al.

(10) Patent No.: US 8,850,911 B2
(45) Date of Patent: Oct. 7, 2014

(54) PRELOAD UNIT MODULE

(75) Inventors: Ramon Jurjanz, Erlangen (DE); Fritz Wiesinger, Kammerstein (DE); Tomas Smetana, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 567 days.

(21) Appl. No.: 12/745,124

(22) PCT Filed: Oct. 29, 2008

(86) PCT No.: PCT/EP2008/064653
§ 371 (c)(1),
(2), (4) Date: May 27, 2010

(87) PCT Pub. No.: WO2009/068403
PCT Pub. Date: Jun. 4, 2009

(65) Prior Publication Data
US 2010/0300827 A1 Dec. 2, 2010

(30) Foreign Application Priority Data

Nov. 28, 2007 (DE) .......................... 10 2007 057 254
Feb. 29, 2008 (DE) .......................... 10 2008 011 910

(51) Int. Cl.
| F16H 25/00 | (2006.01) |
| F16H 25/12 | (2006.01) |
| F16D 13/42 | (2006.01) |
| F16H 25/18 | (2006.01) |
| F16D 27/10 | (2006.01) |
| F16D 27/00 | (2006.01) |
| F16D 23/12 | (2006.01) |

(52) U.S. Cl.
CPC .............. *F16D 23/12* (2013.01); *F16D 27/004* (2013.01); *F16D 2023/123* (2013.01); *F16H 25/186* (2013.01); *F16D 27/10* (2013.01)
USPC ............... 74/57; 74/56; 192/93 A; 192/54.52; 192/70.23

(58) Field of Classification Search
USPC ........ 476/48, 31, 63, 40–42; 192/93 A, 99 A, 192/41 A, 84.7, 70.23, 54.52; 464/36, 464/45–48; 74/56, 57, 567
See application file for complete search history.

(56) References Cited

U.S. PATENT DOCUMENTS

| 2,009,964 | A | * | 7/1935 | Mottlau | ................... 192/45.005 |
| 2,055,239 | A | * | 9/1936 | Mottlau | ....................... 192/48.3 |
| 2,259,473 | A | * | 10/1941 | Johnson | .......................... 192/44 |
| 2,555,215 | A | * | 5/1951 | Warner | .......................... 192/35 |
| 3,501,211 | A | * | 3/1970 | Molloy | ......................... 384/580 |
| 3,649,094 | A | * | 3/1972 | Russell | ........................ 384/533 |
| 3,811,744 | A | * | 5/1974 | Wren et al. | .................... 384/623 |

(Continued)

FOREIGN PATENT DOCUMENTS

| DE | 10 2004 015 271 | 10/2004 |
| DE | 10 2005 053 555 | 8/2007 |
| FR | 2 286 975 | 4/1976 |

*Primary Examiner* — Troy Chambers
*Assistant Examiner* — Emily Cheng
(74) *Attorney, Agent, or Firm* — Simpson & Simpson, PLLC

(57) ABSTRACT

A preload unit module, which has at least one ramp disk and a cage, which carries a plurality of rolling bodies that are held axially against one another in a positively locking fashion. The cage is rotationally pivotable relative to the at least one ramp disk.

12 Claims, 13 Drawing Sheets

(56) References Cited

U.S. PATENT DOCUMENTS

| | | | |
|---|---|---|---|
| 4,667,788 A * | 5/1987 | Johnston et al. | 192/45.016 |
| 4,822,183 A * | 4/1989 | Lederman | 384/607 |
| 4,883,374 A * | 11/1989 | Rhoads et al. | 384/618 |
| 5,106,349 A * | 4/1992 | Botterill et al. | 475/150 |
| 5,482,150 A * | 1/1996 | Stark | 192/45.012 |
| 5,485,904 A | 1/1996 | Organek et al. | |
| 5,620,072 A | 4/1997 | Engle | |
| 6,394,660 B1 * | 5/2002 | Butler et al. | 384/620 |
| 2001/0011622 A1 * | 8/2001 | Arai et al. | 192/35 |
| 2001/0047919 A1 * | 12/2001 | Mayr | 192/93 A |
| 2006/0054373 A1 | 3/2006 | Mueller | |
| 2007/0154122 A1 * | 7/2007 | Brown et al. | 384/91 |
| 2007/0155573 A1 | 7/2007 | Gassmann | |

* cited by examiner

PRELOAD UNIT MODULE

CROSS-REFERENCE TO RELATED APPLICATIONS

This application is a 371 of PCT/EP2008/064653 filed Oct. 29, 2008, which in turn claims the priority of DE 10 2007 057 254.0 filed Nov. 28, 2007, and DE10 2008 011 910.5 filed Feb. 29, 2008, the priority of these applications is hereby claimed and these applications are incorporated by reference herein.

DESCRIPTION

The invention relates to a preload unit module.

BACKGROUND OF THE INVENTION

Preload unit modules of this type are used in transmissions in motor vehicles, in order in particular to permit the actuation of a friction clutch in the drive train of a motor vehicle.

German patent DE 10 2005 053 555 B3 discloses an axial displacement device in the form of a ball ramp arrangement. The axial displacement device comprises two disks centered on a common axis, one of which is supported axially and the other is axially displaceable, and of which at least one can be driven in rotation. The two disks in each case have on their mutually facing end faces an equally large multiplicity of ball grooves running in the circumferential direction. The two disks are therefore mounted with balls as rolling bodies.

U.S. Pat. No. 5,485,904 likewise discloses a preload unit of which the ramp disks are arranged such that they can be rotated with respect to each other by means of balls as rolling bodies.

Likewise, U.S. Pat. No. 5,620,072 discloses a preload unit for a multi-plate clutch, the ramp disks of which are likewise arranged such that they can be rotated with respect to each other by means of balls as rolling bodies.

FIG. 1 shows, schematically, the use of a preload unit 1 according to the prior art. A preload unit 1 is used, for example, in an all-wheel coupler unit and, as illustrated in FIG. 1, is composed substantially of a casing 60, in which a second multi-plate clutch 54, a first multi-plate clutch 52 and the preload unit 1 are arranged in accordance with the prior art. The casing 60 of the all-wheel coupler unit has a transmission input shaft 56 and a transmission output shaft 58. The preload unit 1 comprises a first ramp disk 2 and a second ramp disk 5. Between the two ramp disks 2 and 5 there are between five and six balls, which constitute the rolling bodies 3. Formed in the ramp disks 2 and 5 are in each case corresponding ramps (not illustrated in FIG. 1) or ramp contours 8 (not illustrated in FIG. 1), in which the rolling bodies 3 roll. The ramps 9, 10 are formed obliquely, which effects low-friction displacement of the two ramp disks 2, 5 in the direction of the axis 50. With the displacement of the two ramp disks 2 and 5, a lift in the direction of the axis 50 can thus be achieved. One of the ramp disks 2 or 5 can be engaged electromagnetically by means of the first multi-plate clutch 52.

FIG. 2 shows a schematic illustration of a preload unit 1 as known from the prior art. The preload unit 1 comprises a first ramp disk 2 and a second ramp disk 5. Between 5 and 6 rolling bodies 3 are provided between the two ramp disks 2 and 5. The rolling bodies 3 of the prior art are formed as balls. The second ramp disk 5 is followed by a thrust disk 7, which is mounted with respect to the second ramp disk 5 by an axial bearing 6. As can be seen from the illustration in FIG. 2, a first pitch circle 62, on which the rolling bodies 3 are arranged, has a smaller diameter than a second pitch circle 64, on which the axial bearing 6 is arranged. As a result of the difference between the first pitch circle 62 and the second pitch circle 64, when the preload unit 1 is loaded, a force deflection occurs. This has the disadvantage that, as a result, it is possible for deformations and high mechanical stresses of the first ramp disk 2 and the second ramp disk 5 to occur. The axial force flow 66 is thus not completely parallel to the axis 50.

German patent DE 10 2004 015 271 B4 discloses a torque transfer device. Here, the rolling bodies and the axial bearing are fitted on a pitch circle which has the same diameter. Balls are used as rolling bodies.

An axial preload unit is likewise employed in the bevel gear differentials to prestress multi-plate clutches of the superimposition stages.

As described in FIG. 1 and FIG. 2, the second ramp disk 5 is provided with internal toothing and is connected to the transmission output shaft 58 and thus to the rear axle (not illustrated). Between the transmission input shaft 56 and the transmission output shaft 58 there is the second multi-plate clutch 54. When the transmission input shaft 56 and the transmission output shaft 58 rotate at different speeds (e.g. when the rear wheels are on ice), the ramp disks 2 and 5 of the preload unit 4 rotate relative to each other. The normal force resulting from this actuates the second multi-plate clutch 54. The torque can thus be transmitted from the transmission to the rear axle. In order to save fuel on the highway, the plates of the preload unit 1 can be disengaged electromagnetically. In this case, the drive is provided only to the front wheels of the motor vehicle.

BRIEF SUMMARY OF THE INVENTION

The invention is based on the object of devising a preload unit module which can be mounted at least in a simple way in a transmission provided for the purpose.

It is advantageous when at least one of the ramp disks and a cage carrying a plurality of rolling bodies are held axially against each other in a positively locking manner. The cage is rotationally pivotable with respect to the at least one ramp disk.

The preload unit module substantially comprises the first ramp disk, the cage for holding the rolling bodies, the second ramp disk, a bearing and a thrust disk. Here, the cage, the first ramp disk, the rolling bodies in the cage, the second ramp disk and the bearing are secured or connected to one another to form a self-contained unit.

The thrust disk is held on the bearing in a positively locking manner, so that all the components form the self-contained unit.

The cage comprises a radial disk, on which first and second retaining tabs are formed. The first and second retaining tabs protrude substantially perpendicularly from the radial disk, the first retaining tabs pointing in an axial direction which is opposite to the axial direction of the second retaining tabs.

Formed on the first and second retaining tabs in each case are retaining lugs, which interact at least with the first ramp disk and the second ramp disk in order to hold them in a positively locking manner.

The cage is preferably a bent sheet metal part or a drawn or punched bent component made of sheet metal. Formed in the radial disk of the cage are a plurality of pockets in order to guide and hold the rolling bodies. The pockets have resilient mountings formed, into which the rolling bodies snap.

The rolling bodies may be balls or rollers. It is of particular advantage when at least three but at most five rollers are arranged between the two ramp disks, distributed equally on the cage. In the preferred embodiment, three rollers are arranged distributed equally between the two ramp disks. In this case, each of the two ramp disks has three ramp contours formed.

The ramp contours, the rollers and an angle at which the ramps are arranged are coordinated in such a way that, given a specific maximum rotational angle between the two ramp disks, the preload unit achieves a maximum lift movement of 5.5 mm in the direction of the axis.

The ramp contour formed from the two ramps has a triangular cross section. At one point, the ramp disk has a reduced wall thickness as compared to the wall thickness of the ramp disk on which no ramp contour is formed.

The ratio of the diameter of the rollers to the reduced minimal wall thickness caused by the ramp contour is less than 8:1.

It is of particular advantage when the two ramp disks can be produced as cold-formed components from a sheet metal blank. In this case, the ramp contours are likewise impressed into the ramp disk. This impressing is likewise a cold-reforming process.

Cold-reformable steel of the "16MnCr5" type has proven to be advantageous as a material for the sheet metal blanks. A cold-reformable steel of the "C45" type is likewise advantageous as a material for the sheet metal blanks, it being necessary for the reformed sheet metal blanks to be hardened before the mechanical loading in the preload unit. For those skilled in the art, it is obvious which hardening method is best suited for this purpose.

In order to achieve security against overload, it is advantageous if the rollers between the first ramp disk and the second ramp disk are arranged on a first pitch circle. Furthermore, the bearing between the second ramp disk and the thrust disk is arranged on a second pitch circle. The advantage of the present invention is that the first pitch circle and the second pitch circle have the same diameter.

The preload unit substantially comprises the first ramp disk, a cage for holding the rollers, the second ramp disk, the bearing and the thrust disk.

BRIEF DESCRIPTION OF THE SEVERAL VIEWS OF THE DRAWINGS

In the following text, exemplary embodiments serve to explain the invention and its advantages in more detail by using the appended figures, in which.

DETAILED DESCRIPTION OF THE INVENTION

Although the following description of the preload unit module 1 relates to the use of three rollers between the ramp disks 2, 5, this is not to be understood as a restriction of the invention. As can already be gathered from the preceding description, three to five rollers may be arranged between the first and the second ramp disks 2, 5. Furthermore, it should be pointed out that, in the various figures, the same designations are used for the same elements. Likewise, the present invention may also be implemented with balls as rolling bodies.

Figure 1:
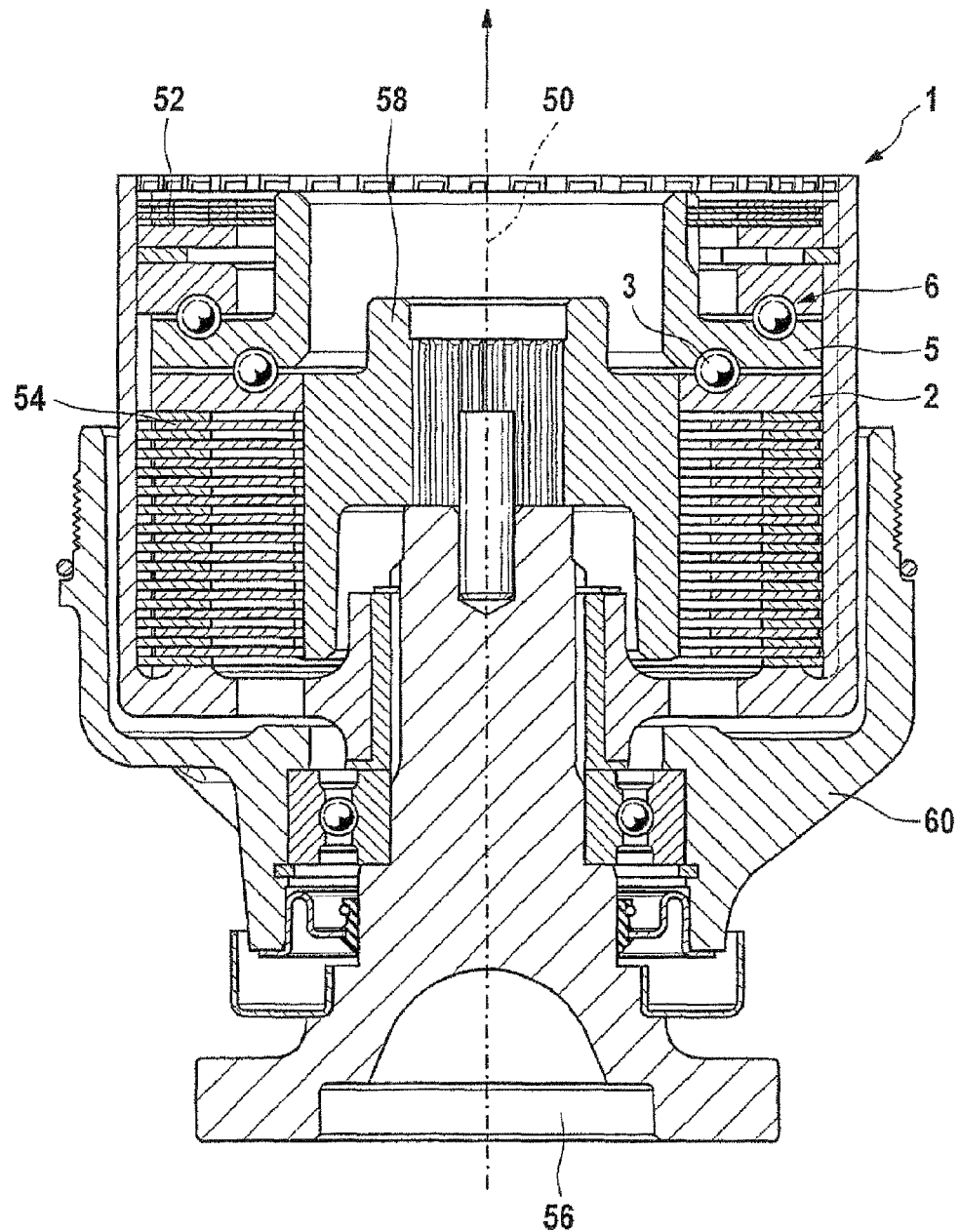
FIG. 1 shows a schematic illustration of the use of a preload unit in an all-wheel coupler unit.
Figure 2:
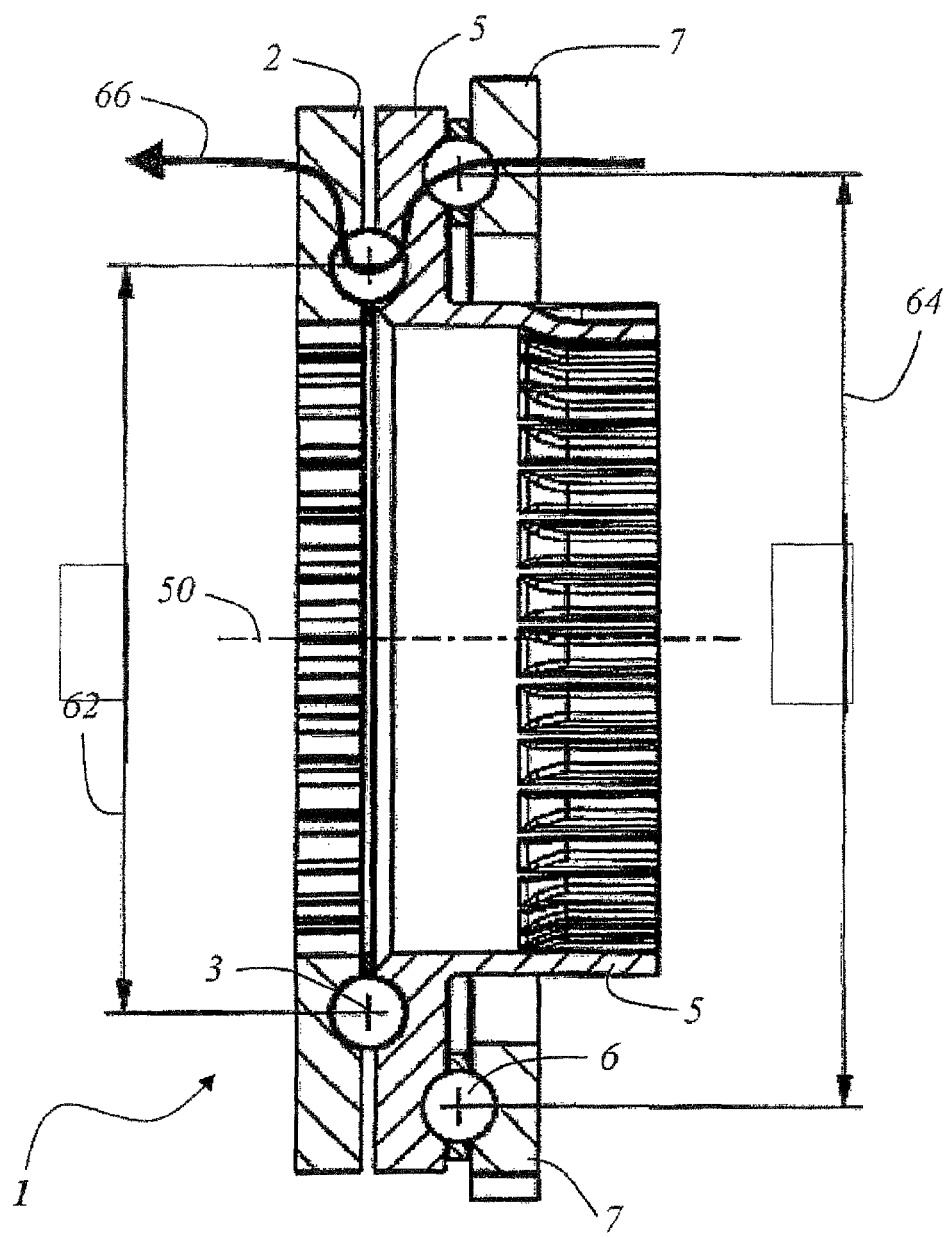
FIG. 2 shows a schematic illustration of the configuration of a preload unit according to the prior art.
Figure 3:
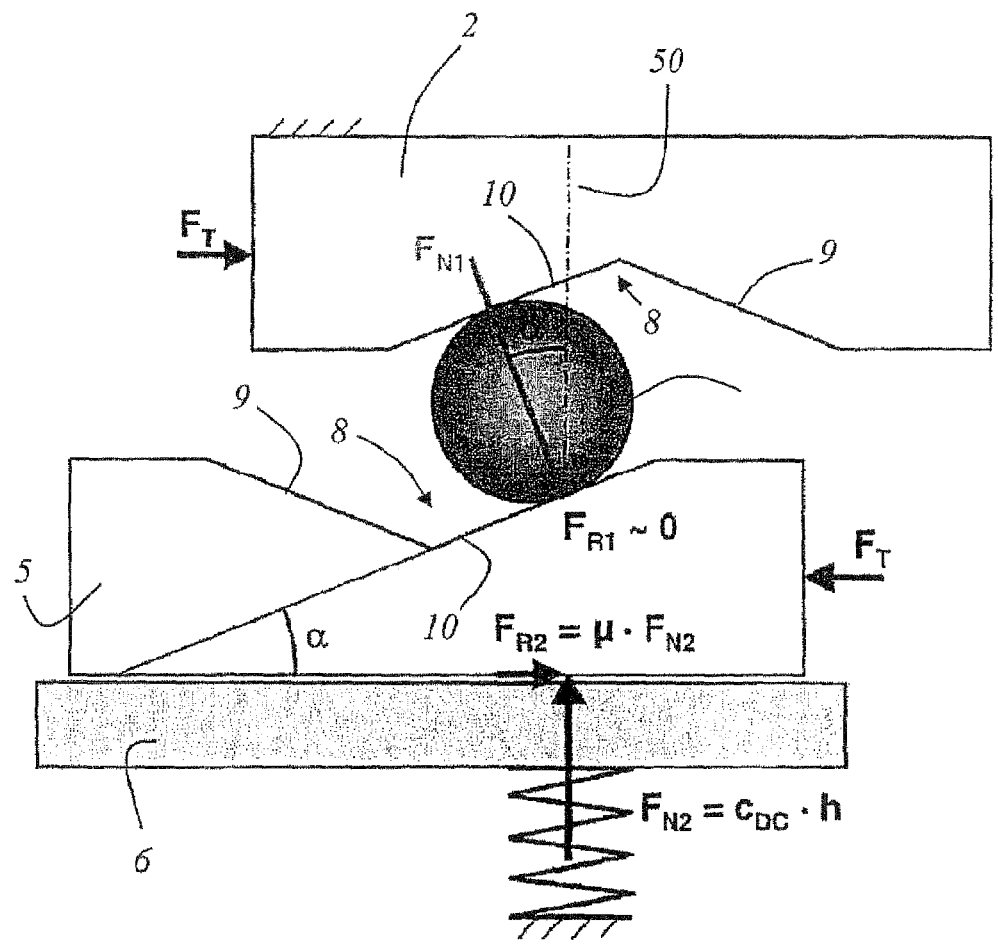
FIG. 3 shows a schematic illustration of the forces acting in the preload unit when the latter is actuate.

FIG. 3 shows a schematic illustration of the forces acting when the first ramp disk 2 is rotated with respect to the second ramp disk 5. The first ramp disk 2 and the second ramp disk 5 in each case have a ramp contour 8 formed. The ramp contour 8 comprises a first ramp 9 and a second ramp 10. The two ramps 9, 10 are inclined at an angle α. As a result of the rotation of the ramp disks 2 and 5 relative to each other, the rolling bodies 3 roll along the inclined ramps 9 or 10. This effects a low-friction displacement of the ramp disks 2 and 5 in the direction of the axis 50. The displacement takes place until a lift h has reached its maximum. The tangential force $F_T$ produced by the torsional moment on the two ramp disks 2 and 5 thus leads to axial preloading of the preload unit module 1 with a force $F_{N2}$ in the axial direction. From the rollers, a normal force $F_{N1}$ acts on the two ramps 10. The axial force $F_{N2}$ is calculated by using equation 1.

$$F_{N2} = c_{DC} * h \qquad \text{(Equation 1)}$$

The tangential force $F_T$ can be calculated from equation 2.

$$F_T = F_{N2} * (\mu * \cos\alpha + \sin\alpha) / \cos\alpha \qquad \text{(Equation 2)}$$

The normal force $F_{N1}$ acting on the ramps 9 and 10 is calculated by using equation 3.

$$F_{N1} = F_{N2} / \cos\alpha \qquad \text{(Equation 3)}$$

The coupling moment $T_{BC}$ acting is calculated by using equation 4.

$$T_{BC} = F_T * (D_m / 2) \qquad \text{(Equation 4)}$$

Here, $D_m$ is the pitch circle diameter, α is the angle at which the ramps 9 and 10 are inclined, h is the axial lift which can be achieved by the rotation of the ramp disks 2 and 5 relative to each other, $c_{DC}$ is a parameter for the stiffness of the multiplate clutch used, and μ is the coefficient of friction.

Figure 4:
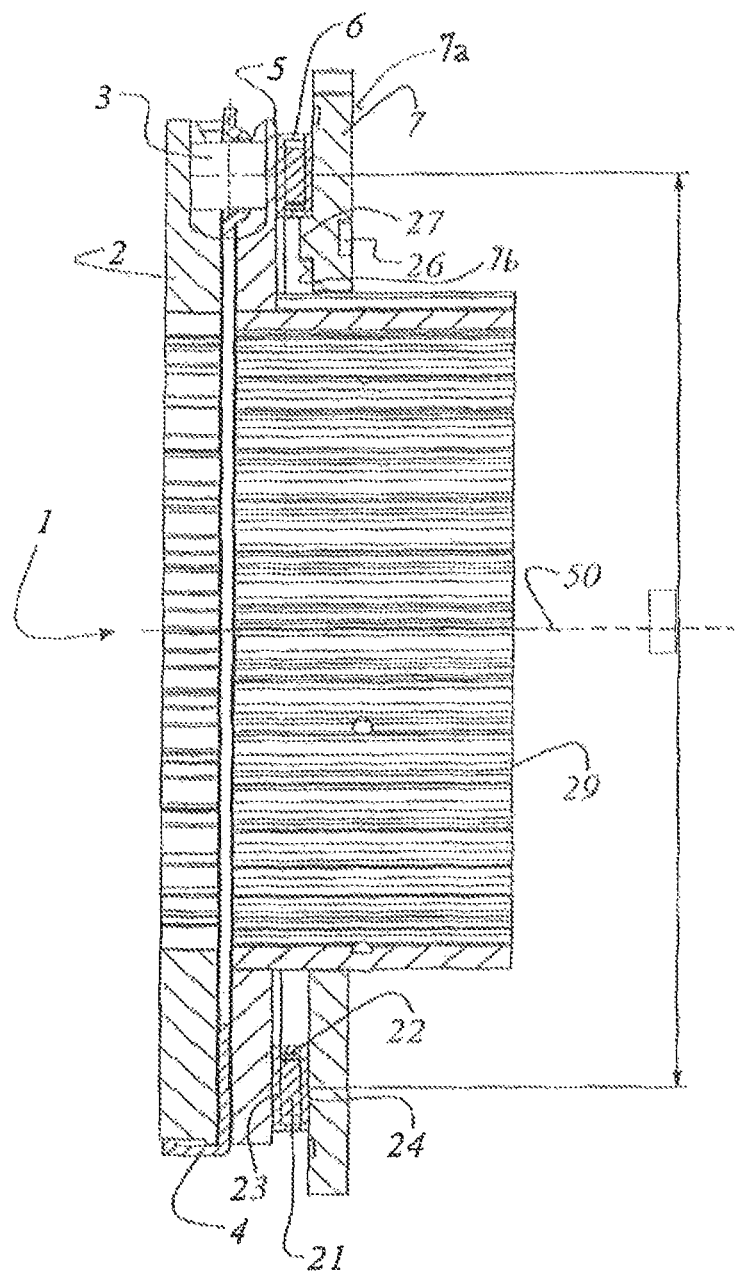
FIG. 4 shows a sectional view through a preload unit module according to the present invention.

FIG. 4 shows a sectional illustration of the preload unit module 1 according to the invention. The preload unit module 1 substantially comprises a first ramp disk 2 and a second ramp disk 5. Arranged between the first ramp disk 2 and the second ramp disk 5 are a plurality of rolling bodies 3. The rolling bodies 3 in the embodiment illustrated here are formed as rollers. It has been shown that it is particularly advantageous when at least three rollers but no more than five rollers are arranged between the first ramp disk 2 and the second ramp disk 5. By means of the rollers, it is possible to rotate the first ramp disk 2 relative to the second ramp disk 5 in relation to each other as far as possible without friction. Between the second ramp disk 5 and the thrust disk 7 an axial bearing 6 is provided. The axial bearing 6 in the embodiment illustrated here is arranged between a first running disk 23 and a second running disk 24. The axial bearing 6 comprises a plurality of needles 21, which are arranged in a cage 22. The axial bearing 6 shown in FIG. 4 is encapsulated by means of the running disks 23 and 24 to form a self-contained unit. As can be seen from the illustration of FIG. 4, the rollers, which are provided between the first ramp disk 2 and the second ramp disk 5, lie on a first pitch circle 62. Likewise, the axial bearing 6, which is arranged between the second ramp disk 5 and the thrust disk 7, lies on a second pitch circle 64. According to the present invention, the first pitch circle 62 and the second pitch circle 64 have the same diameter.

Figure 5:
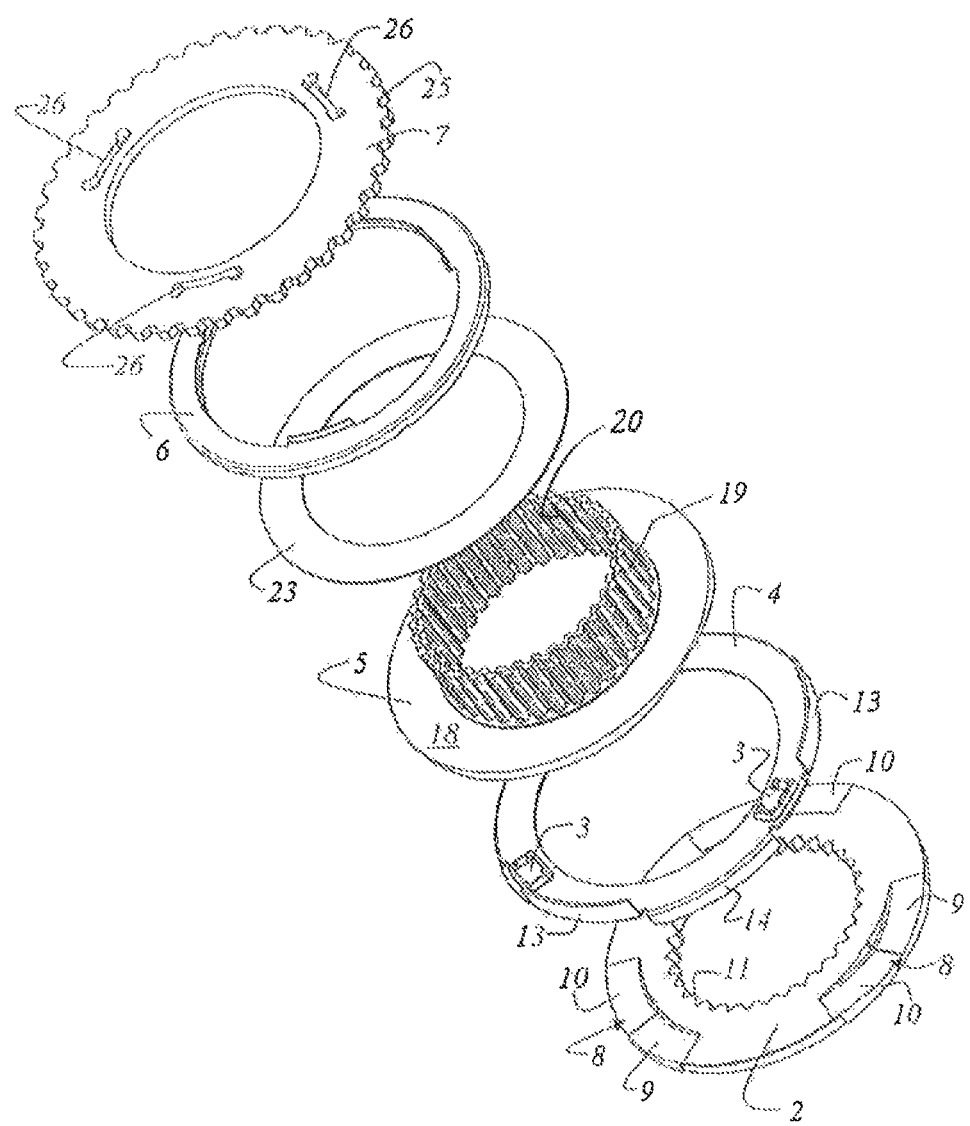
FIG. 5 shows an exploded illustration of the preload unit module according to the invention.

FIG. 5 shows a perspective view of the exploded illustration of the preload unit module 1. As can be seen from this illustration, the preload unit module 1 substantially comprises a first ramp disk 2, a cage 4, in which a plurality of rolling bearings 3 are arranged. As already mentioned several times, the rolling bearings 3 are formed as rollers or else as balls, which are held in pockets 16 provided for that purpose. The cage 4 is followed by the second ramp disk 5. The upper side 5a of the second ramp disk 5, which has no ramps 9, 10 impressed, rests on the axial bearing 6. The axial bearing 6 is followed by the thrust disk 7.

Since the cage 4 in the embodiment illustrated here carries three rollers, three ramp contours 8 are thus impressed in the first ramp disk 2. Each of the ramp contours 8 comprises a first ramp 9 and a second ramp 10. In addition, the first ramp disk 2 has toothing 11 on the inside, which provides fixed-torque engagement in a transmission shaft, not illustrated. The first ramp disk 2 is preferably a punched and impressed part, which is produced by means of cold reforming.

The cage 4 substantially comprises a radial disk 12, from which a first retaining tab 13 and a second retaining tab 14 are molded. The first retaining tabs 13 and the second retaining tabs 14 here protrude substantially perpendicularly from the radial disk 12. Formed in the radial disk 12, corresponding to the number of rollers or rolling bodies 3, are the pockets 16, in which the rollers are held.

The second ramp disk 5 has a radial flange 18, which is connected in one piece to a sleeve 19 extending axially. Alternatively, sleeve 19 and radial flange 18 are components joined to each other. On the radial flange 18, a plurality of ramps 8 are likewise formed. The sleeve 19 is toothed for fixed-torque but axially displaceable engagement with a shaft, not illustrated. In the example illustrated in FIG. 5, a toothing system 20 is formed from corrugated sheet metal. The second ramp disk 5 is optionally a drawn-punched-impressed component made from a forged or sheet metal blank. As an alternative to this, the second ramp disk 5 may be flow-pressed from the aforementioned blanks.

As already described, the second ramp disk 5 is followed by the axial bearing 6. As already mentioned in the description relating to FIG. 4, the axial bearing 6 is a needle bearing having a plurality of needles 21. The needles 21 here are guided in a cage 22. The running track for the needles 21 are formed either on the ramp disk 5 and/or the thrust disk 7 or, as in the example shown in FIG. 4, on the running disks 23 and 24. The axial bearing 6 illustrated in FIG. 5 is encapsulated by means of the running disks 23 and 24 to form a self-contained unit.

The axial bearing 6 is followed by the thrust disk 7. The thrust disk 7 is preferably a punched and impressed component and has toothing 25 both on the inside and the outside for fixed-torque connections. Fixed-torque connections are preferably connections made in a positively locking manner, with which torques can be transmitted about the axis of rotation of the components. Furthermore, the thrust disk 7 has a plurality of moldings on an upper side 7a.

Figure 6:
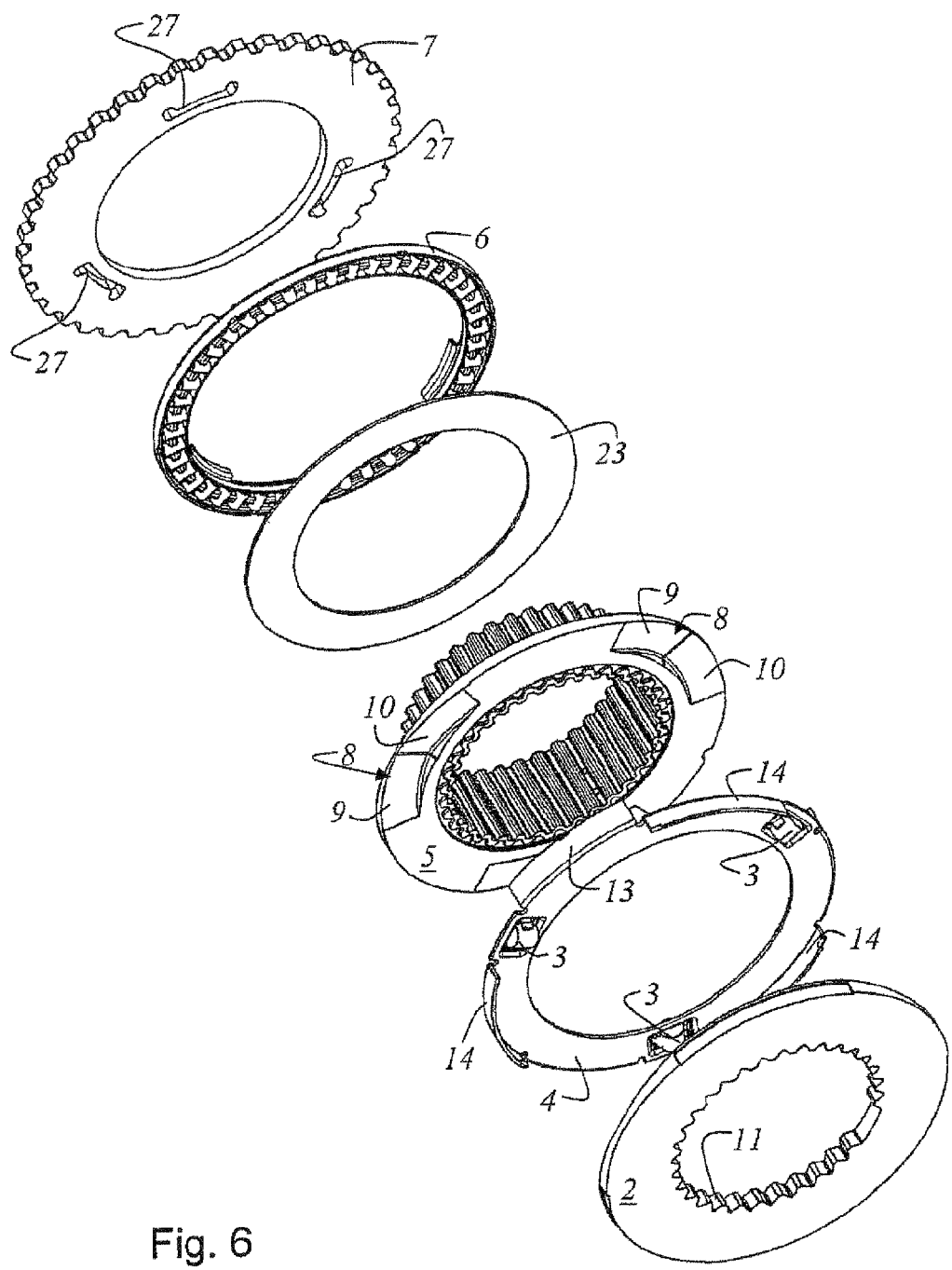
FIG. 6 likewise shows an exploded illustration of the preload unit module according to the invention, but the view being directed from above onto the first ramp disk.

FIG. 6 shows a perspective exploded illustration of the preload unit module 1 according to the invention, the view here being of the underside 2b of the first ramp disk 2. As already mentioned in the case of the first ramp disk 2, the second ramp disk 5 also has a plurality of ramp contours 8, which are formed from a first ramp 9 and a second ramp 10. The ramp contours are formed on the underside 5b of the ramp disk 5. The thrust disk 7 has on its underside 7b guide humps 27 which, as has already been described in FIG. 5, have been formed by the moldings 26 on the upper side 7a of the thrust disk. The thrust disk 7 is pushed onto the sleeve 19 and placed on the axial bearing 6 in such a way that the thrust disk 7 is centered radially with respect to the axis of rotation 50 on the axial bearing 6 via the guide humps 27. Alternatively, the guide humps 27 are elements which connect the axial bearing 6 to the thrust disk 7 in a positively locking manner.

Figure 7:
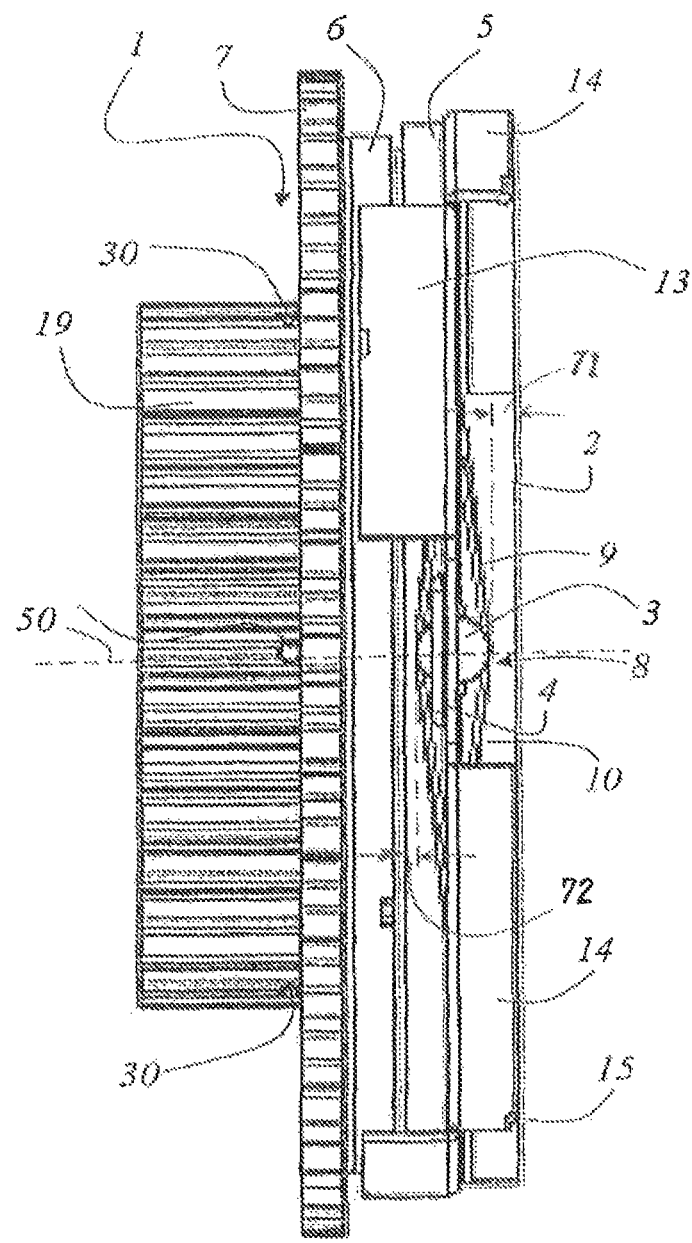
FIG. 7 shows a side view of the preload unit module according to the invention, the rollers being located between the two ramp disks at the lowest point of the ramp contour.

FIG. 7 shows a side view of the preload unit 1. Here, the first ramp disk 7 and the second ramp disk 5 are located in a position with respect to each other such that the roller 3 is located at the respectively lowest point of the ramp contour 8. In this position, no axial lift 74 occurs between the first ramp disk 2 and the second ramp disk 5. As a result of impressing the ramp contour 8 into the first ramp disk 2, a minimal wall thickness 71 is provided at the lowest point of the ramp contour 8 in the first ramp disk 2. Likewise, as a result of impressing the ramp contour 8 in the second ramp disk 5, a minimal wall thickness 72 is provided. In the embodiment of the preload unit 1 shown in FIG. 7, the thrust disk 7 is secured axially on the sleeve 19, at least after the maximum axial lift 74, by means of a plurality of radial protrusions 30. The protrusions 30 are produced by means of plastic displacement of material out of the sleeve 19.

Figure 8:
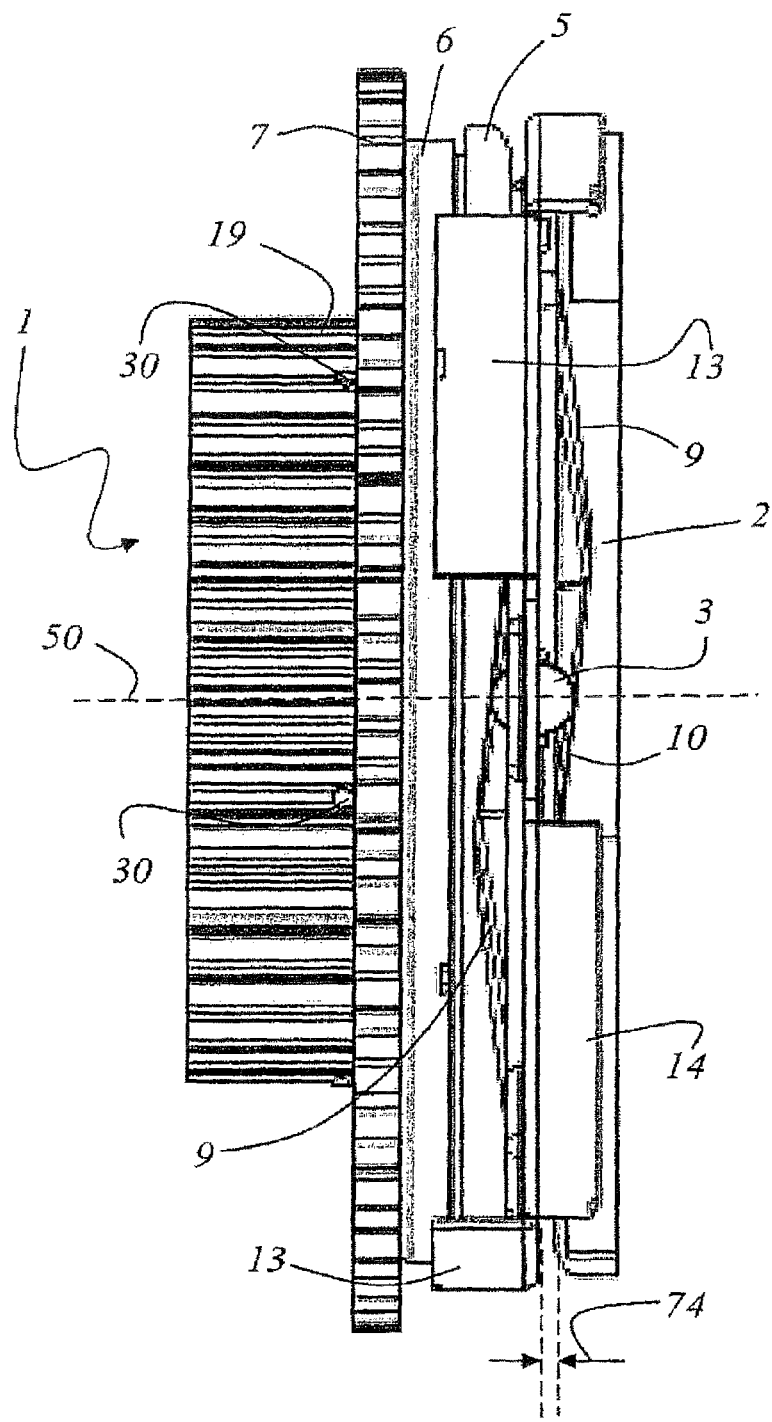
FIG. 8 shows a schematic side view of the preload unit module, at least one of the two ramp disks being rotated with respect to each other, so that there is a lift in the direction of the axis between the first ramp disk and the second ramp disk.

FIG. 8 shows the situation in which the first ramp disk 2 has been rotated relative to the second ramp disk 5 in relation to each other. As a result, the roller is moved on the ramp contour 8 from the lowest point to another point on the ramp contour 8. In the illustration shown here, the roller thus rests on the second ramp 10 of the two ramp disks 2 and 5. As a result of the rotation of at least one of the ramp disks 2 and 5 relative to each other, an axial lift 74 is thus established. As already mentioned in the description relating to FIG. 7, the rollers in the neutral position are at the lowest point between the first ramp 9 and the second ramp 10 of each of the two ramp disks 2 and 5. In the event of relative rotation of the cage 4 and/or of the first ramp disk 2 or the second ramp disk 5 between the first ramp 9 or the second ramp 10 on one of the ramps 9 or 10 as far as the end of the latter, a maximum lift occurs. The second ramp disk 5 is thus raised axially (in the direction of the axis 50) and is thus moved away from the first ramp disk 5 as far as a maximum lift.

Figure 9:
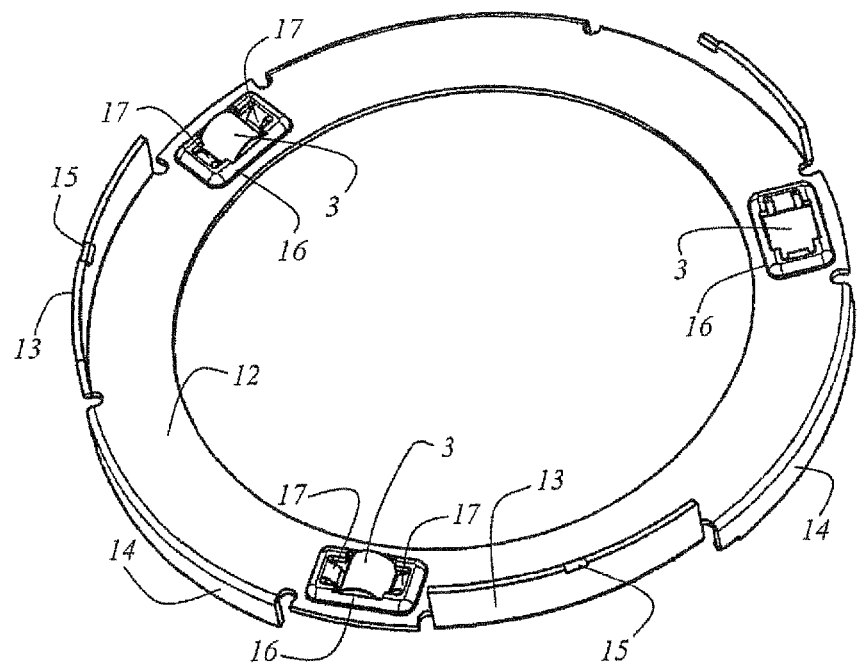
FIG. 9 shows a perspective view of the cage for holding the rollers.

FIG. 9 shows a plan view of the cage 4. In the embodiment shown here, three pockets 16 are formed in the radial disk 12 of the cage 4, in which pockets one or three rollers or rolling bodies 3 are held in each case. First retaining tabs 13 and second retaining tabs 14 protrude perpendiculary or axially in both directions from the radial disk 12. In each case, retaining lugs 15 are formed on the retaining tabs 13 and 14. The cage 4 itself is preferably a bent sheet metal part or a drawn or punched bent component made of sheet metal. The pockets 16 in the radial disk 12 are formed by a deep drawing method. Formed in the pockets 16 are resilient mountings 17, between which the preload rollers are snapped in.

In the embodiment of the preload unit module 1 shown here, as illustrated in the Figures, three rollers are used. Thus, these rollers are inserted into the radial disk 12 of the cage 4 in each case offset by 120°. If more than three rollers are used, the distribution of these rollers on the radial disk 12 of the cage 4 is configured in such a way that there is the same angular spacing between each of the rollers.

Figure 10:
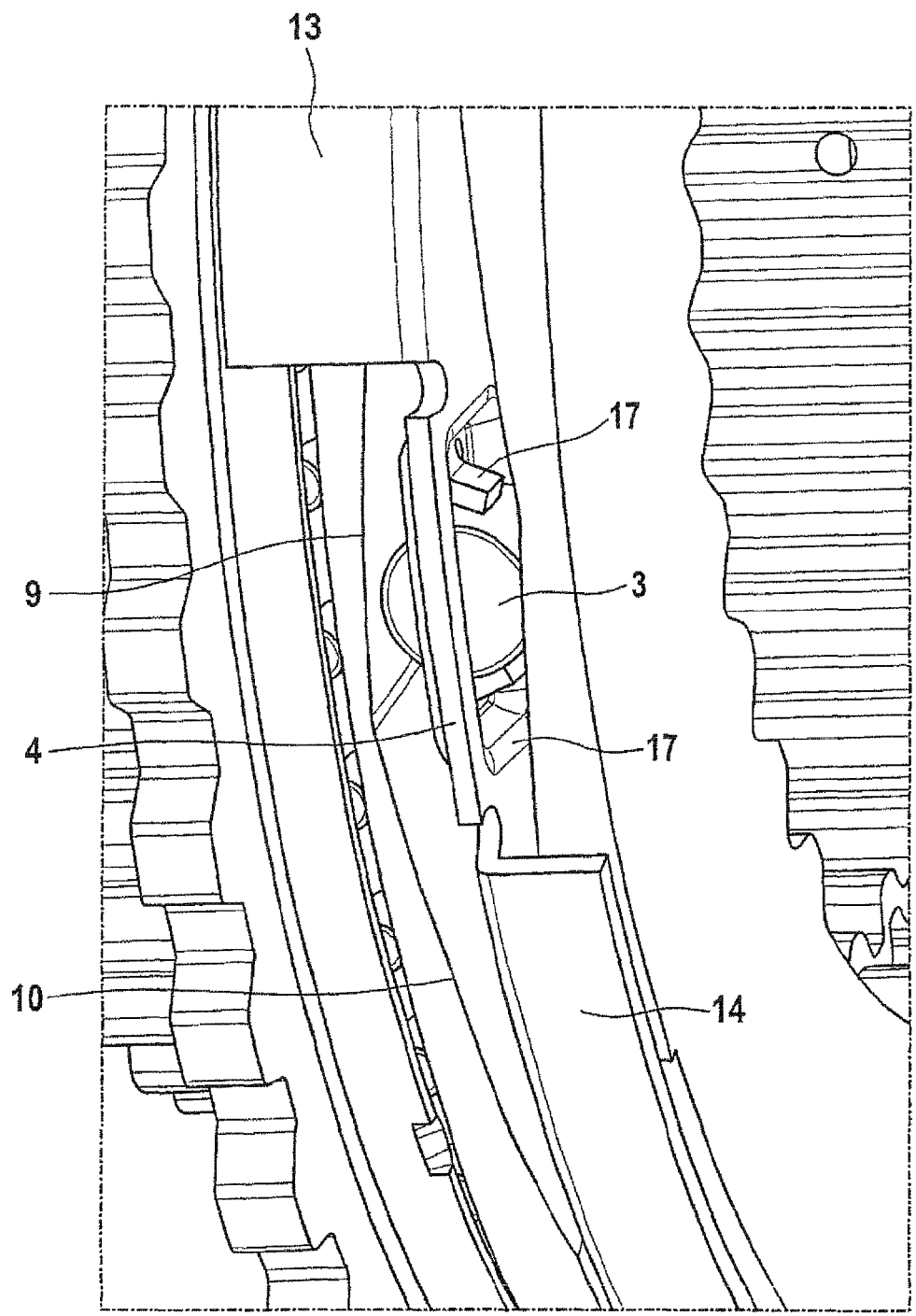
FIG. 10 shows a detail view of the preload unit module, in which the interaction of one of the rollers with the ramp disk can be seen.

FIG. 10 shows a detail view of the preload unit module 1, in which the interaction of the roller held in the cage 4 with the associated ramp contour 8 of the first and the second ramp disks 2 and 5 can be seen. The first and second retaining tabs 13 and 14 formed on the cage 4 are used to mount at least the first ramp disk 2, the second ramp disk 5 and the cage 4 having the rolling bodies 3 to form one unit.

Figure 11:
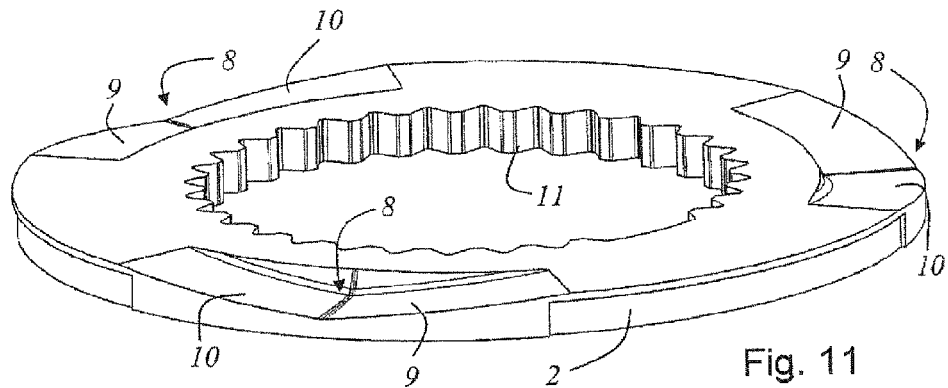
FIG. 11 shows a perspective view of the first ramp disk before placement of the cage (before the cage is placed)
Figure 12:
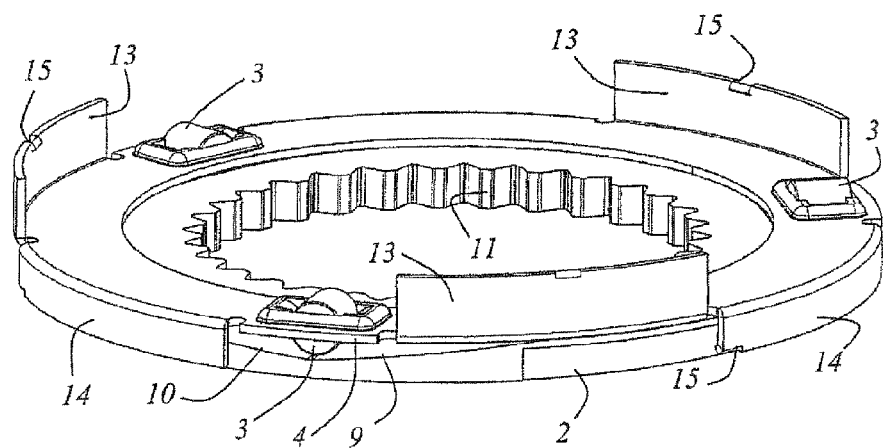
FIG. 12 shows the cage placed on the first ramp disk.
Figure 13:
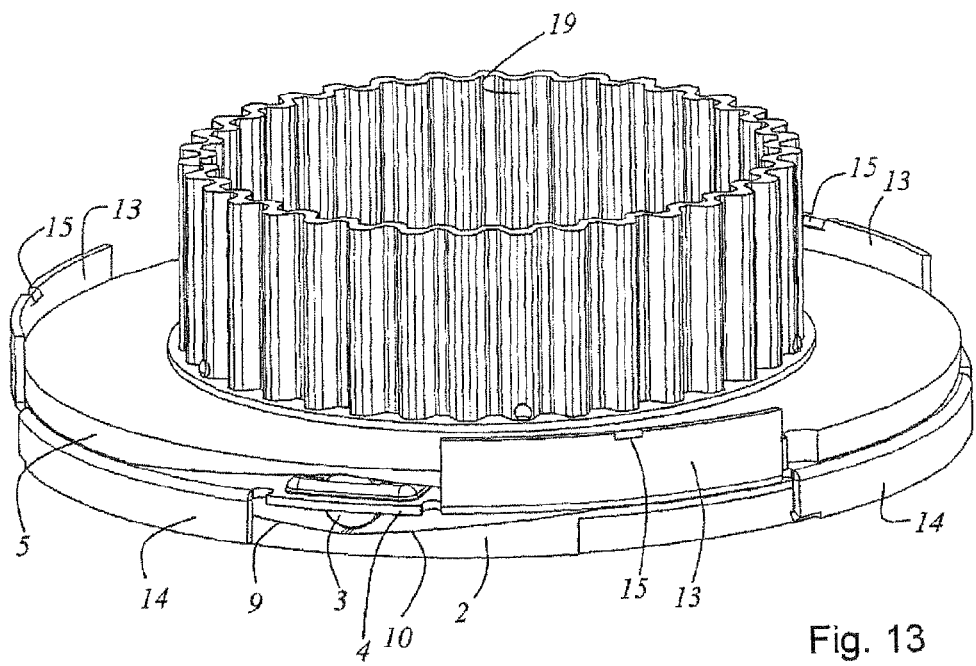
FIG. 13 shows the second ramp disk, which is placed on the cage.

FIGS. 11 to 15 make clear how the individual components of the preload unit module 1 are assembled to form a unit. In FIG. 11, the first ramp disk 2 is shown on its own. In the next mounting step, as can be seen from FIG. 12, the cage 4 is placed on the first ramp disk 5 in such a way that the rolling bodies 3 come to lie on the lowest point of the ramp contour 8 of the first ramp disk 2. The cage 4, on which the first and second retaining tabs 13 and 14 are formed, is used substantially to hold the first ramp disk 2 and the second ramp disk 5. For this purpose, in this mounting step the cage 4 is placed on the first ramp disk 2 in such a way that the second retaining tabs 14 engage radially around the first ramp disk 2, and the retaining lugs 15 of the second retaining tabs 14 engage axially behind the first ramp disk 2. Here, the ramp contour 8 of the first ramp disk 2 is in contact with the rolling bodies 3 provided in the cage 4.

In the next mounting step (see FIG. 13), the second ramp disk 5 is placed on the cage 4 in such a way that the ramp contour 8 of the second ramp disk 5 comes to lie on the rolling bodies 3. The first retaining tabs 13 engage radially around the second ramp disk 2 on the outside. The retaining lugs 15 formed on the first retaining tabs 13 engage axially behind the second ramp disk 5 with a clearance. Thus, at least the first ramp disk 2, the cage 4 and the second ramp disk 5 are joined to one another to form a preassembled unit.

Figure 14:
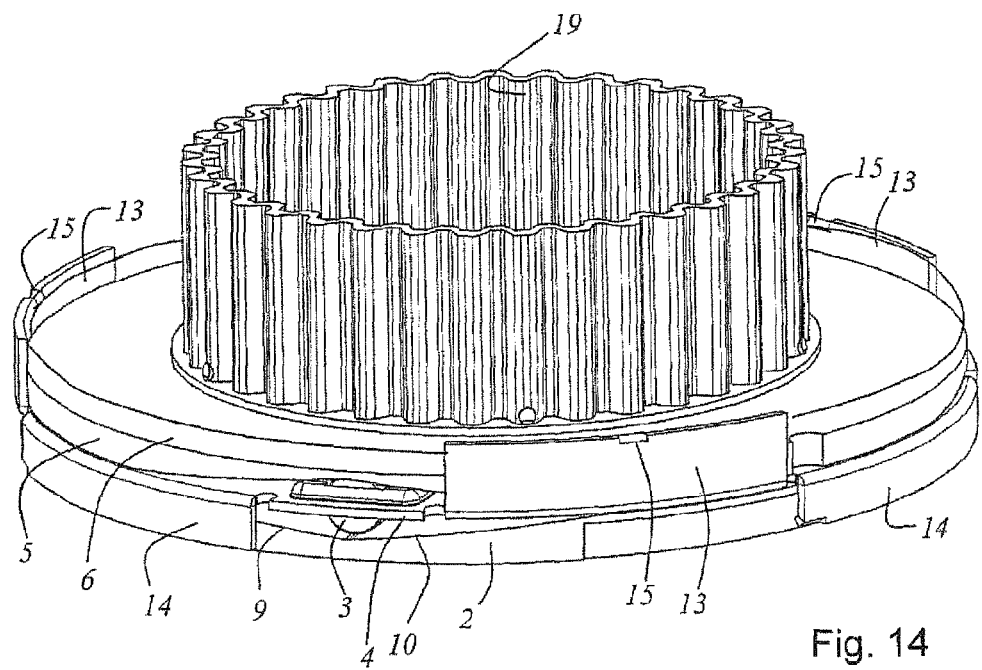
FIG. 14 shows the axial bearing, which rests on the second ramp disk.

In the mounting step illustrated in FIG. 14, the axial bearing 6 is added to the preload unit module 1. The first retaining tabs 13 are so long axially that the first retaining tabs 13 also engage radially around the axial bearing 6, and the retaining lugs 15 engage axially behind the latter. Thus, in this mounting step, the axial bearing 6 is then accordingly mounted by the first retaining tabs 13 by being snapped in.

Figure 15:
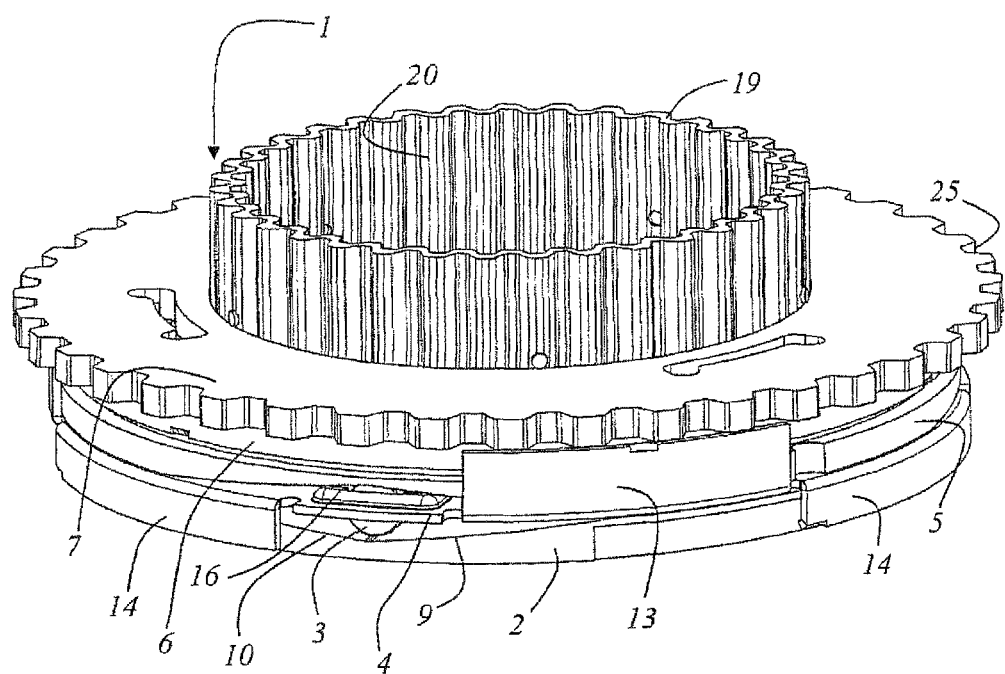
FIG. 15 shows the thrust disk, which is connected to the preload unit.

In the illustration of FIG. 15, the thrust disk 7 is pushed onto the sleeve 19 of the preload unit module 1 and placed on the axial bearing 6 such that the thrust disk 7 is centered radially with respect to the axis of rotation 50 on the inner circumference 28 of the axial bearing 6 via the guide humps 27. The preload unit module 1 assembled in this way then constitutes a preassembled unit, which can then be installed with a few actions during the assembly of a transmission.

The ramp disks 2 and 5, together with the cage 4 and the rollers and also the axial bearing 6 and the thrust disk 7 with external toothing are assembled as a structural unit and are finally retained captively on one another in the unit by means of partial radial peening 30 (see FIG. 8). As a result, the complete preload unit 1 can be transported without additional devices and mounted as a unit at the customer.

The invention has been described with reference to a preferred embodiment. It is self-evident to those skilled in the art that changes and deviations from the invention can be made without departing from the range of protection of the following claims.

The invention claimed is:

1. A preload unit module, comprising:
   a first ramp disk;
   a cage which carries a plurality of rolling bodies;
   a second ramp disk, the cage disposed between the first ramp disk and the second ramp disk, the second ramp disk comprising a sleeve extending away from the cage;
   a bearing arranged on the side of the second ramp disk facing away from the cage and mounted on the sleeve; and,
   a thrust disk mounted on the sleeve, the bearing arranged between the thrust disk and the second ramp disk;
   the cage having a radial disk, a first retaining tab with a first retaining lug, and a second retaining tab with a second retaining lug, the first retaining tab and the second retaining tab extending in opposing axial directions from the radial disk, the cage axially holding the first ramp disk in a positively locking manner using the first retaining lug on the first retaining tab, the cage being rotationally pivotable with respect to the first ramp disk and/or the second ramp disk, the cage axially holding at least one of the second ramp disk and the bearing using the second retaining lug on the second retaining tab;
   each of the first and second ramp disks having inclined ramps, the rolling bodies rolling along the inclined ramps during relative rotation of the first and second ramp disks such that the ramp disks are displaced relative to each other in the direction of an axis of relative rotation; and
   the thrust disk being held on the bearing in a positively locking manner and axially held relative to the second ramp disk by protrusions on the sleeve.

2. The preload unit module recited in claim 1, the cage securing the first ramp disk, the rolling bodies in the cage, the second ramp disk and the bearing to form a self-contained unit.

3. The preload unit module recited in claim 1, wherein the thrust disk is held on the bearing in a positively locking manner by guide humps that connect with the complementary elements.

4. The preload unit module recited in claim 1, wherein the cage is a bent sheet metal part or a drawn or punched bent component made of sheet metal.

5. The preload unit module recited in claim 1, wherein formed in the radial disk of the cage are a plurality of pockets which guide and hold the rolling bodies.

6. The preload unit module recited in claim 5, wherein the plurality of pockets have resilient mountings formed, into which the rolling bodies snap.

7. The preload unit module recited in claim 1, wherein the rolling bodies are balls.

8. The preload unit module recited in claim 1, wherein the rolling bodies are rollers.

9. The preload unit module recited in claim 8, wherein at least three and at most five rollers are arranged between the first ramp disk and the second ramp disk, distributed with equal angular spacing on the cage.

10. The preload unit module recited in claim 9, wherein three rollers are distributed equally between the first ramp disk and the second ramp disk, the first ramp disk and the second ramp disk each having three ramp contours.

11. The preload unit module recited in claim 1, wherein the thrust disk includes guide elements on a side facing the bearing such that the bearing is centered radially relative to the thrust disk by the guide elements.

12. The preload unit module recited in claim 1, wherein the cage axially holds the bearing in a positively locking manner using the second retaining lug, the second ramp disk being held between the bearing and the cage.

* * * * *